(12) United States Patent
Potts (10) Patent No.: US 7,013,937 B2
(45) Date of Patent: Mar. 21, 2006

(54) APPARATUS AND PROCESS FOR MINING OF MINERALS

(75) Inventor: Alan Potts, Derbyshire (GB)

(73) Assignee: MMD Design and Consultancy, Derbyshire (GB)

(*) Notice: Subject to any disclaimer, the term of this patent is extended or adjusted under 35 U.S.C. 154(b) by 71 days.

(21) Appl. No.: 10/872,624

(22) Filed: Jun. 21, 2004

(65) Prior Publication Data
US 2004/0251731 A1 Dec. 16, 2004

(30) Foreign Application Priority Data
Dec. 20, 2002 (WO) .................. PCT/GB02/05869

(51) Int. Cl.
B65B 1/04 (2006.01)
(52) U.S. Cl. .................. 141/387; 299/18; 299/64; 299/8; 299/3; 137/355.17
(58) Field of Classification Search .......... 141/387; 405/137, 138, 267; 137/899.1, 355.17; 299/18, 299/64, 83
See application file for complete search history.

(56) References Cited

U.S. PATENT DOCUMENTS

| | | | |
|---|---|---|---|
| 3,358,855 A | 12/1967 | Carlton et al. ............ | 214/10 |
| 3,510,168 A | 5/1970 | Camp ...................... | 299/5 |
| 3,827,454 A * | 8/1974 | Tarter ..................... | 137/899.1 |
| 3,868,964 A * | 3/1975 | Tarter et al. .............. | 406/40 |
| 3,957,076 A * | 5/1976 | Jamison et al. ............ | 137/899.1 |
| 4,099,542 A * | 7/1978 | Gibbons ................... | 137/615 |
| 4,900,191 A | 2/1990 | Schlecht .................. | 405/138 |
| 6,701,980 B1 * | 3/2004 | Rothrock .................. | 141/231 |

FOREIGN PATENT DOCUMENTS

WO WO 96/30629 A1 10/1996

* cited by examiner

Primary Examiner—Steven O. Douglas
(74) Attorney, Agent, or Firm—Nikolai & Mersereau, P.A.

(57) ABSTRACT

Apparatus for transporting mineral from a point of mining to a remote location, the apparatus including a mobile mineral breaker rig (MBR) having a mineral outlet, the rig including a fluid inlet pipe for receiving conveying fluid, a mineral inlet for introducing mineral from said mineral outlet into said fluid pipe and a fluid outlet pipe for conveying said fluid mixed with mineral received from said mineral outlet, an extensible pipeline assembly (EPA) connected at one end to said inlet and outlet pipes and being adapted for connection at its opposite end to one end of a static pipeline communicating with said remote location, said extensible pipeline assembly being expandable to enable said mobile rig to move away from said one end of the static pipeline whilst maintaining fluid communication therewith, said extensible pipeline assembly comprising a series of elongate pipe assemblies (90a, 90b, 90c) which are articulated at adjacent ends to one another in a zig-zag manner via an articulated joint, each elongate pipe assembly including two lengths of pipe which are arranged side-by-side and secured together such that one length of pipe defines an upper pipe and the other length of pipe defines a lower pipe, the articulated joint between each end of adjacent elongate pipe assemblies including an upper rotary joint (107) which connects adjacent ends of the upper pipes of adjacent pipe assemblies and a lower rotary joint (106) which connects adjacent ends of the lowerpipes of adjacent pipe assemblies, the axis of rotation of the upper and lower rotary joints of each articulated joint being co-axial.

9 Claims, 8 Drawing Sheets

APPARATUS AND PROCESS FOR MINING OF MINERALS

CROSS REFERENCE TO RELATED APPLICATIONS

This application claims priority from International Application Number PCT/GB02/05869 International filing date Dec. 20, 2002. Priority Date claimed Dec. 21, 2001.

The present invention relates to apparatus and process for mining of minerals in which the won mineral is transported away from the point of mining by fluid along a pipeline.

The invention is particularly suitable for the open cast mining of tarsand.

The conventional way of open cast mining of tarsand involves digging the tarsand from a layer deposit of tarsand and transferring the dug tarsand to a series of trucks which each transport the dug tarsand to a fixed fluid conveyor inlet station. The fluid conveyor inlet station is connected to a remote tarsand processing plant by a tarsand conveying pipeline and serves the purpose of enabling the dug tarsand to be introduced into the tarsand conveying pipeline. The fluid conveyor inlet station is also connected by a pipeline to a source of conveying fluid, usually water. The source of water is usually a settlement pond located at the tarsand processing plant and so it is common for the fluid conveyor inlet station to be connected to the tarsand processing plant by two pipelines (viz. a water supply pipeline and a tarsand conveying pipeline) which run in parallel form the tarsand processing plant to the fluid conveyor inlet station.

The fluid conveyor inlet station includes a mixing chamber into which the dug tarsand is deposited by the trucks. In the mixing chamber the tarsand is mixed with water to produce a slurry. The slurry is passed through a sizer to remove unwanted large lumps and is fed into a fluid pump connected to the tarsand conveying pipeline and pumped along the tarsand conveying pipeline to the processing station.

Typically the maximum throughput of dug tarsand is in the order of 5000 tons per hour and in order to convey this quantity from the fluid conveyor input station to the tarsand processing station the diameter of the tarsand conveying pipeline is about 1 meter.

Typically the distance between the fluid conveyor input and the tarsand processing station is in the order of 4 kilometres. It is important therefore for the slurry to be continually pumped along the tarsand conveying pipeline in order to avoid settlement of the tarsand in the pipeline. Should this occur, it is necessary to pump water only along the tarsand conveying pipeline until the settled-out tarsand is removed. During this time, mining of the tarsand has to be stopped.

A general aim of the present invention is to provide an apparatus and process for mining of minerals which enables the won mineral to be introduced into a fluid conveyor at the location of mining for transport to a remote location and thereby obviate the need for a series of trucks and a fixed fluid conveyor inlet station.

According to one aspect of the present invention there is provided an apparatus for transporting mineral from a point of mining to a remote location, the apparatus including a mobile mineral breaker rig having a mineral outlet, the rig including a fluid inlet pipe for receiving conveying fluid, a mineral inlet for introducing mineral from said mineral outlet into said fluid pipe and a fluid outlet pipe for conveying said fluid mixed with mineral received from said mineral outlet, an extensible pipeline assembly connected at one end to said inlet and outlet pipes and being adapted for connection at its opposite end to one end of a static pipeline communicating with said remote location, said extensible pipeline assembly being expandable to enable said mobile rig to move away from said one end of the static pipeline whilst maintaining fluid communication therewith, said extensible pipeline assembly comprising a series of elongate pipe assemblies which are articulated at adjacent ends to one another in a zig-zag manner via an articulated joint, each elongate pipe assembly including two lengths of pipe which are arranged side-by-side and secured together such that one length of pipe defines an upper pipe and the other length of pipe defines a lower pipe, the articulated joint between each end of adjacent elongate pipe assemblies including an upper rotary joint which connects adjacent ends of the upper pipes of adjacent pipe assemblies and a lower rotary joint which connects adjacent ends of the lower pipes of adjacent pipe assemblies, the axis of rotation of the upper and lower rotary joints of each articulated joint being co-axial.

Various aspects of the present invention are hereinafter described with reference to the accompanying drawings in which:

FIGS. 1a,b,c are schematic illustrations of a process according to a preferred embodiment of the present invention;

Figures 1A, 1B:
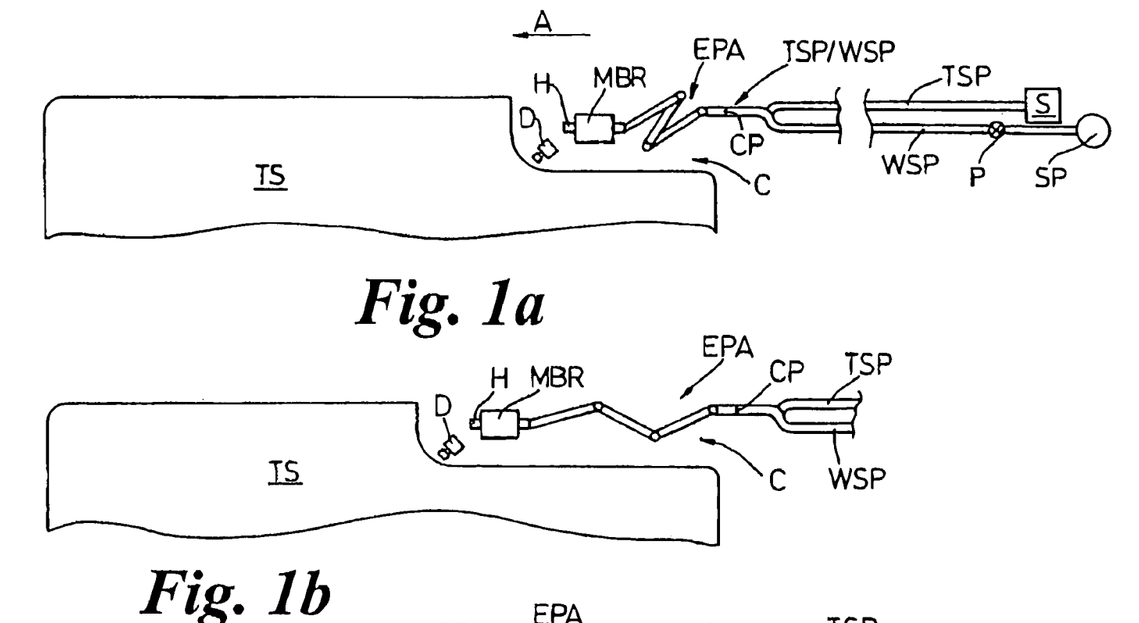

Referring initially to FIG. 1a there is diagrammatically shown a layer deposit of tarsand TS and a digger D which digs tarsand and deposits the tarsand into a mobile breaker rig MBR. The rig MBR is connected to a static water supply pipeline WSP and a static tarsand conveying pipeline TSP by an extensible pipeline assembly EPA. The pipeline TSP is connected to a tarsand processing station S whereat at the tar is separated from the sand. Sand and water are deposited into a settlement pond SP and the water from the pond is pumped by a pump P along the water supply pipeline WSP.

The digger D deposits dug tarsand into a receiving hopper H of the rig MBR, and as described later, the dug tarsand is subsequently introduced into the extensible pipeline assembly EPA and is transported to the tarsand processing station along pipeline TSP.

As the digger advances in direction A along the tarsand layer deposit, it cuts a channel C and the mobile rig MBR advances also in direction A so as to enable the digger to deposit dug tarsand into the hopper H by slewing its bucket into position.

As the rig MBR advances in direction A, the extensible pipeline assembly EPA extends from is fully contracted condition $E_{min}$ until a maximum extension $E_{max}$ is reach as shown in FIG. 1b.

Figure 1C:
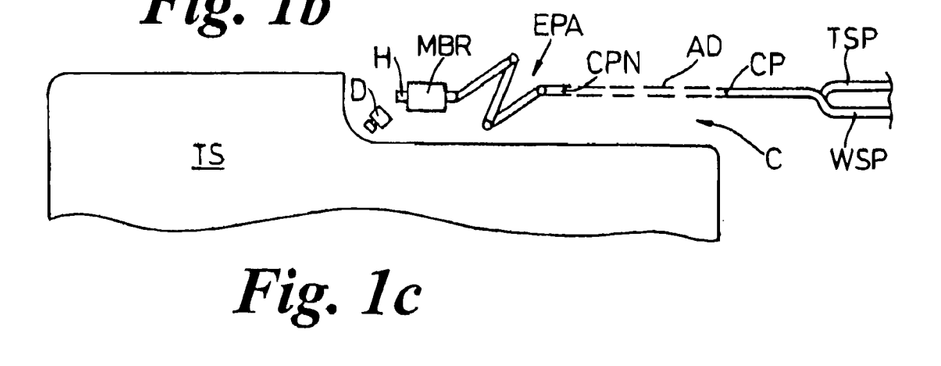

When the maximum extension has been reached, the extensible pipeline is disconnected from the static pipelines WSP, TSP at connection point CP, and contracted back to its fully contracted condition $E_{min}$. The static pipelines are then extended by the introduction of additional pipes AD to form a new connection end CPN of the pipelines WSP,TSP which are at an advanced position in direction A. The extensible pipeline assembly is reconnected to the new connection end CPN of pipelines WSP,TSP to enable further advancement of the rig MBR in direction A as shown in FIG. 1c.

The extendable length by which the extensible pipeline assembly EPA may be extended between its fully extended condition and its fully contracted condition is preferably chosen so as to enable the mining operation to run continuously as long as possible so as to minimise the number of times the is mining operation has to be stopped to enable extension of the static pipelines TSP,SWP to be made. It is envisaged that the extendable length may be in the region of 200 metres but it will be appreciated that it may be more or less than 200 meters.

The mobile rig MBR and extensible pipeline assembly EPA are shown in greater detail in FIGS. 2 to 5.

Figures 2A, 2B:
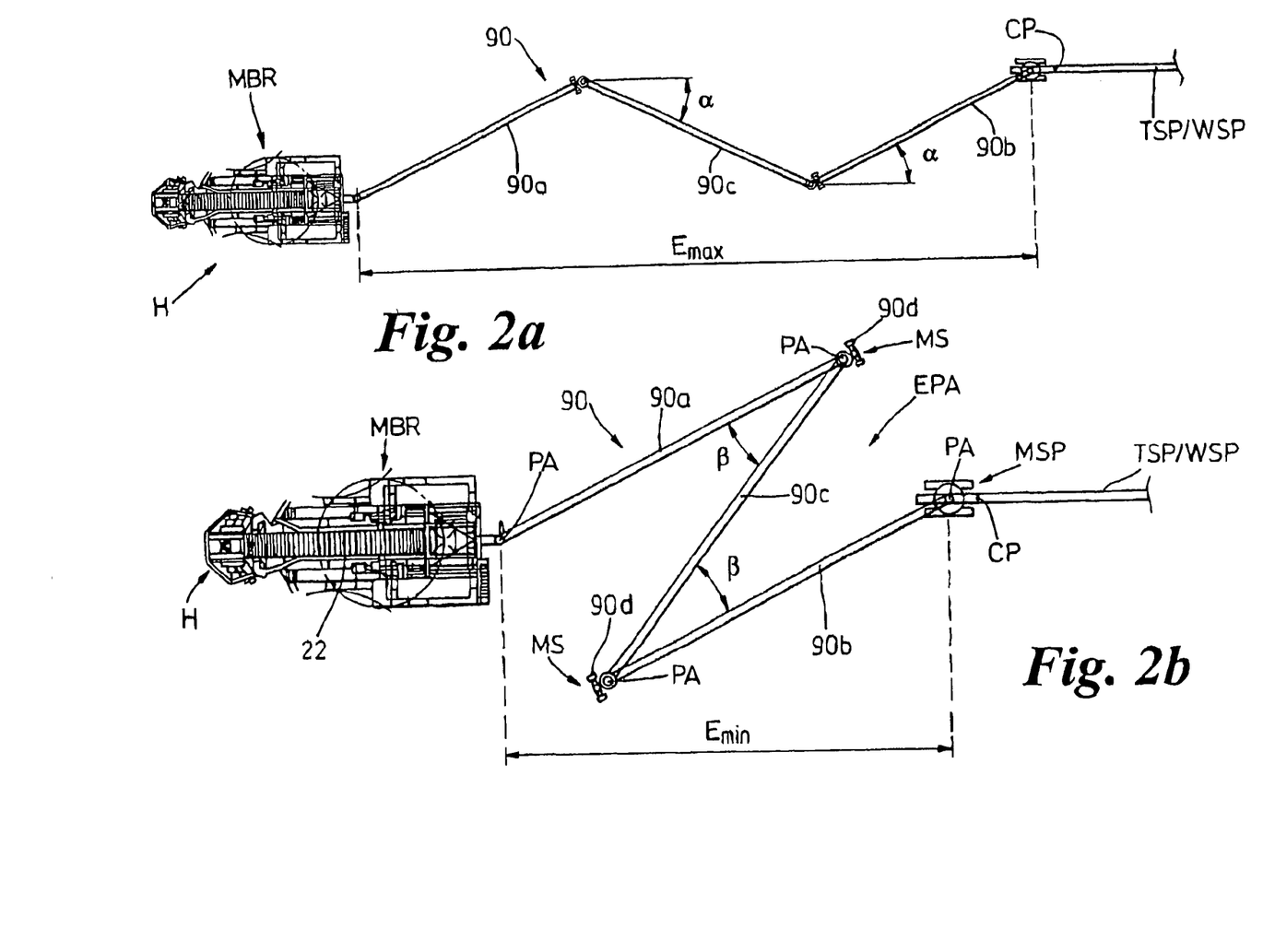
FIGS. 2a, 2b are plan views of an apparatus according to a first embodiment of the present invention shown with the extensible assembly fully extended and fully contracted, respectively.
Figure 3:
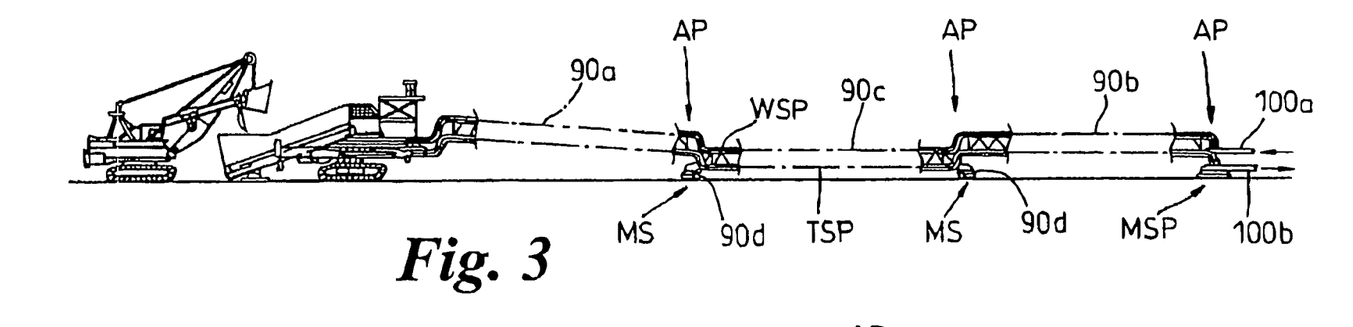
FIG. 3 is a side view of the first embodiment.

The extensible pipeline assembly EPA preferably comprises a series of elongate pipe assemblies 90 which are articulated to one another in a zigzag manner. The assembly EPA has a first end assembly 90a which is connected to the mobile rig MBR and a second end assembly 90b which is connected to the static pipelines WSP,TSP. The first and second assemblies 90a,90b are interconnected by at least one intermediate pipe assembly 90c.

At each point of articulation PA there is provided a mobile ground support MS which supports the assemblies 90 on the ground whilst static or whilst being moved during extension or contraction of the assembly EPA.

Articulation about articulation points AP is preferably restricted such that the zigzag formation is retained when the assembly EPA is fully extended In this respect the articulation is preferably restricted such the angle α is about 25 degrees or greater when the assembly is fully extended, viz. the angle subtended between adjacent pipe assemblies is about 130° or less. This enables the assembly EPA to be contracted by moving the first and second end assemblies 90a,90b inwards toward one another.

The point of articulation PA between the second end assembly 90b and pipelines TSP,WSP is preferably supported on a power driven support MSP which enables the second end assembly 90b to be driven in direction A after disconnection from pipelines TSP,WSP and so cause contraction of assembly EPA. During contraction, the pipe assemblies 90 are pushed together about their points of articulation preferably up to a predetermined stop limit wherein angle β is a predetermined minimum which prevents adjacent assemblies 90 engaging one another. Preferably angle β is about 25°.

During expansion of the extensible pipeline assembly EPA, it is envisaged that the mobile rig MBR will pull first end assembly 90a and so pull the intermediate assembly 90c and end assembly 90b until the maximum extension is achieved.

It is therefore envisaged that the supports MS, apart from MSP which carries the articulation between the second assembly 90b and pipelines WSP,TSP will be free moving and preferably in the form of castors 90d.

Each castor has a wheel assembly 190 rotatably mounted on a carriage frame 191. The carriage frame 191 is mounted on a support frame 192 attached to lower pipe 102 via a turntable having a vertical axis of rotation which is co-axial with the axis of rotation AR. However it is also envisaged that if the power requirement for pushing/pulling all the assemblies cannot be met by the rig and support MSA then one or more of the supports MS may be power driven and preferably radio controlled.

After disconnecting the assembly EPA from the static pipelines TSP, WSP the assembly EPA is contracted to its fully contracted condition by advancement of the powered mobile support MSP which is preferably in the form of a chassis mounted on tracks.

If it is desired to increase the extendable length of the assembly EPA, it is envisaged that one or more additional extensible units comprising assemblies 90a, 90b, 90c may be added. Each extensible unit would include a powered support MSP carrying an articulation point between pipe assembly 90b of one unit and pipe assembly 90a of another unit The powered support MSP in between each unit would act to push the pipe assembly 90c of the upstream unit (in direction A) and pull the pipe assembly 90a of the downstream unit.

Figure 4:
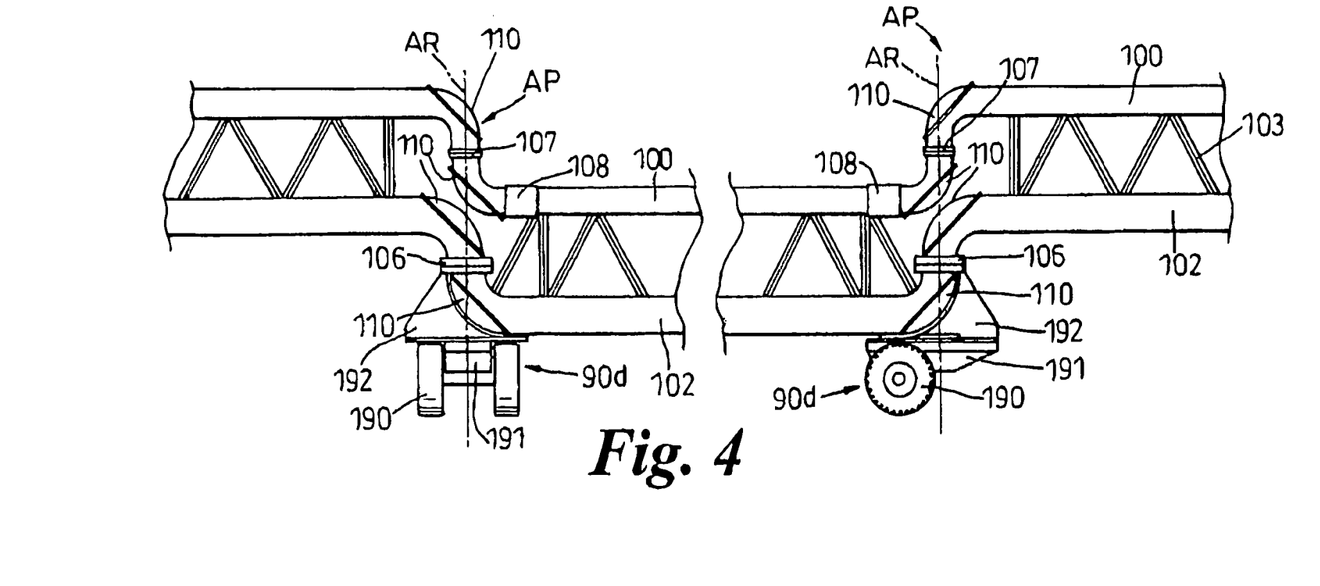
FIG. 4 is an enlarged side view of the fluid conveyor pipelines shown in FIG. 3.

As more clearly seen in FIG. 4, each assembly 90 is preferably constructed from two lengths of pipe, viz. an upper pipe 100 and a lower pipe 102, which are located side by side and are rigidly secured together, preferably, by a lattice of struts 103. This arrangement provides a self-supporting structure enabling the pipes 100,102 to span a relatively long distance when only being supported from opposite ends at articulation points AP. The pipes 100, 102 are preferably made in one piece from steel and are about 1 meter in diameter. Typically the length of the pipes 100,102 between the points of articulation AP is about 50 meters but it is envisaged that the length may be longer, e.g. 100 meters.

At each point of articulation, the lower pipes 102 mounted directly onto a support MS and are joined to one another by a rotary joint 106 having an axis of rotation AR. The joint 106 preferably includes a rotary bearing so as to act as a turntable between the connected pipes 102. Preferably the joint is also constructed to accommodate a limited amount of lateral movement between the connected pipes 102.

The upper pipes are connected by a rotary joint 107 which has an axis of rotation co-axial with the axis AR. To accommodate lateral deflection permitted by the joints 106, one or both the pipes 100, 102 preferably include a telescopic portion 108 which may be defined by a sliding joint or a flexible joint.

It is envisaged that the lower pipe 102 is used to convey the tarsand slurry and that the upper pipe is used to convey fresh water. Thus at the articulation point connecting the second end assembly to the static pipelines WSP,TSP the mobile support MSA carries a connection pipes 100a, 102a for connection to pipelines WSP and TSP respectively.

At the mobile rig MBR the pipes 100,102 of first end assembly 90a are connected to a water inlet pipe 100b and a tarsand slurry outlet pipe 102b via joints 107,106 respectively.

It will be noted that at each articulation point AP, the tarsand slurry is caused to flow around bends in the pipe 102; this is advantageous as it encourages mixing of the tarsand with water and also helps lumps to degrade. Preferably at each bend, a replaceable bend piece 110 which forms part of the pipe is provided so that a new bend piece 110 may be fitted should abrasive wear from the tarsand slurry occur.

It is envisaged that the electrical cable required to power the mobile rig may conveniently be mounted to run along the assembly EPA. In such a case, when the static pipelines WSP,TSP are extended, it is necessary to carry out an extension of the power cable at the same time.

Figure 5:
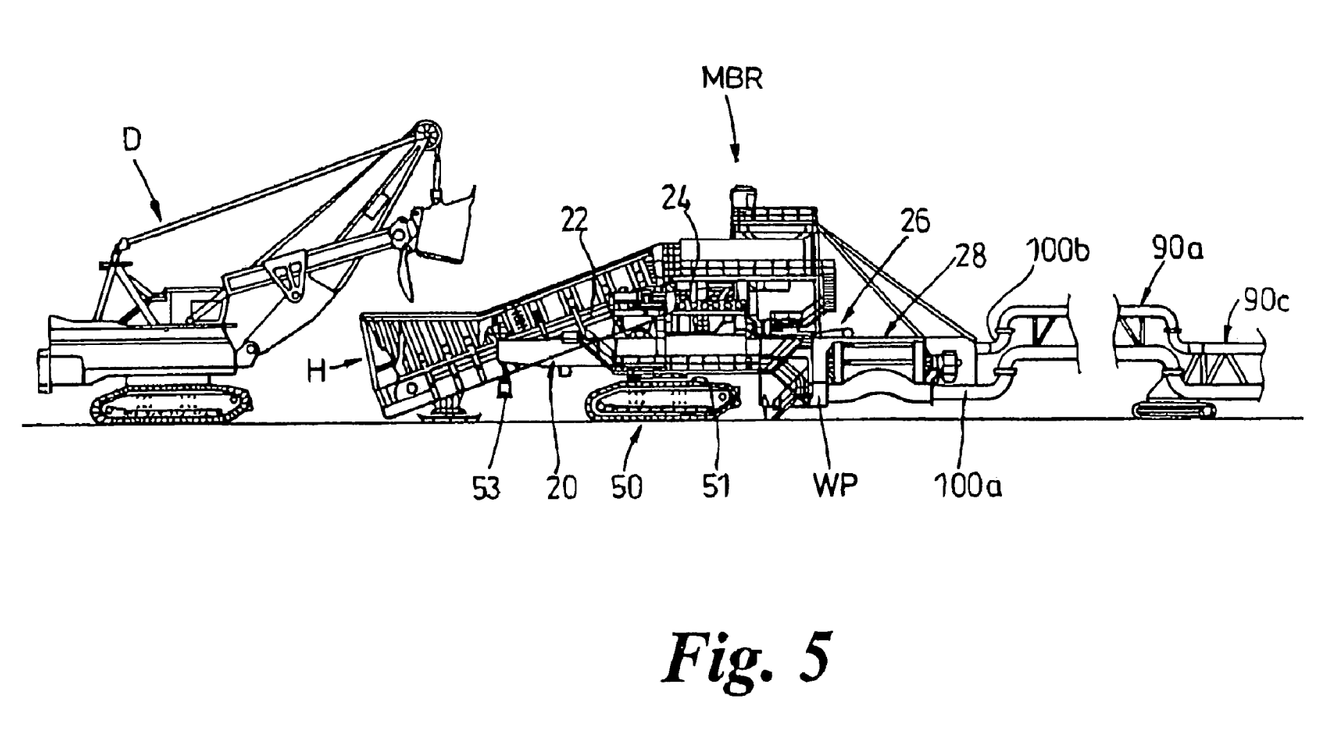
FIG. 5 is an enlarged side view of the mobile mineral breaker rig shown in FIG. 3.

The mobile breaker rig MBR includes a chassis 20 on which is mounted the hopper H into which tarsand dug by digger D is deposited. The deposited tarsand is conveyed by a feed conveyor 22 to a mineral breaker 24 The mineral breaker is preferably of a construction as disclosed in our European patents Nos. 0 167 178 and 0 096 706.

The tarsand passes through the mineral breaker 24 and in so doing, lumps of in excess of a predetermined size are broken down so that tarsand emerging from the breaker 24 contains no lumps in excess of the predetermined size Typically the predetermined size will be in the region of 500 mm.

The tarsand emerging from the breaker is deposited onto a take-away conveyor 26 which transports the tarsand to a rotary mineral valve 28 via which the tarsand is introduced into the extensible pipeline assembly for transport to the tarsand processing station TS.

Figure 6:
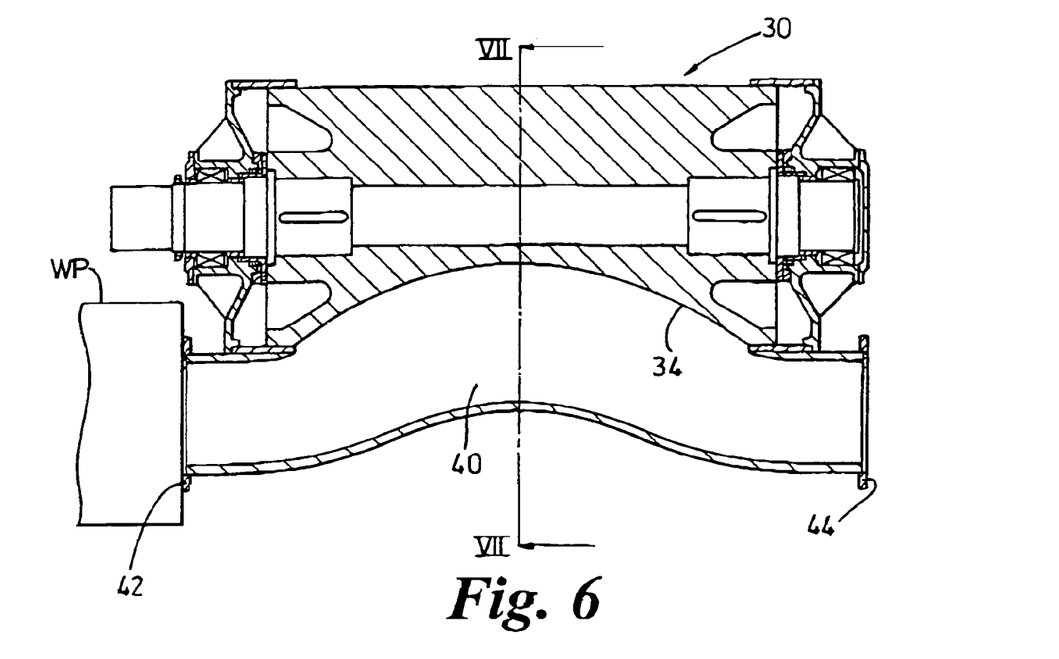
FIG. 6 is an axial sectional view of the mineral inlet valve shown in FIG. 5.
Figure 7:
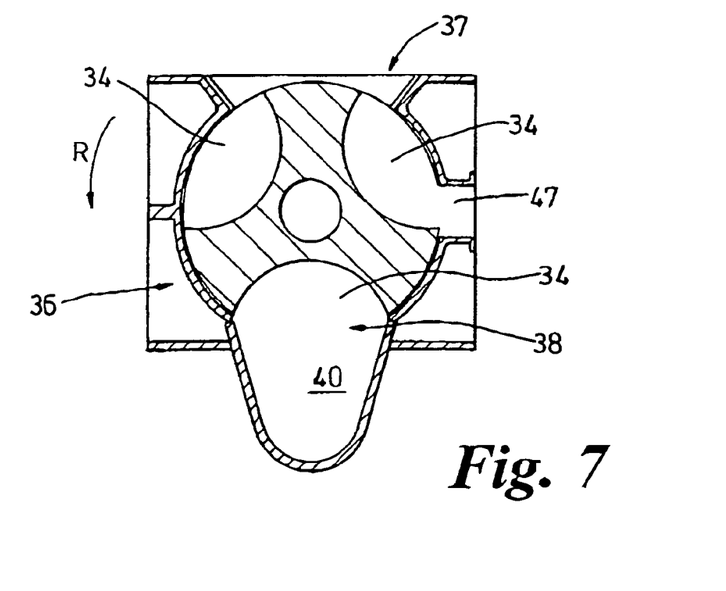
FIG. 7 is a sectional view taken along lines VII—VII in FIG. 6.

The valve 28 preferably includes a rotating shaft or drum 30 having a series of mineral accommodating pockets 34 spaced about its circumference. In FIG. 7, three pockets 34 are shown but it will be appreciated that more or less than three pockets 34 may be provided.

The drum 30 is housed in a casing 36 having an upper inlet port 37 into which mineral is deposited. Deposited mineral enters a pocket 34 as the drum is rotated in direction of arrow R and is transferred by the pocket 34 to a lower output port 38 which communicates with a conduit 40 along which water supplied from the pipe 100*a* communicating with pipeline WSP. The conduit is connected to pipe 100*a* at its inlet end 42 to the pipeline WSP and is connected at its outlet end 44 to the pipe 102*a* for communication with pipeline TSP.

A water pump WP, such as a turbine pump, is mounted on the chassis 20 immediately upstream of the valve 28 for pumping water supplied from the water supply pipeline WSP into the inlet 42 preferably through a venturi which acts to accelerate water entering conduit 40. The conduit 40 is also preferably curved as shown to create a sweep in the flow of water to ensure that the pocket 34 is cleaned out of mineral before it re-enters the casing 36.

Preferably a water outlet port 47 is provided in the casing 36 which enables water to empty out of each pocket before it returns to the inlet port 37.

The chassis 20 is supported on the ground by a tracked assembly 50 via a slewing assembly 51. The chassis 20 also preferably includes extensible legs 53 locate at each corner of the chassis 20. Each leg 53 preferably has an enlarged ground engaging pad 54 fitted thereto to spread load applied to soft ground. The extensible legs 53 when retracted are located clear of the ground but can be extended to raise the chassis 20 away from the ground in order to lift the track assembly clear of the ground. This enables to the track assembly to be slewed to a desired rotary position before being lowered onto the ground by retraction of the legs 53. In this way the rig MBR can be moved in any direction away from a static position.

Figure 8:
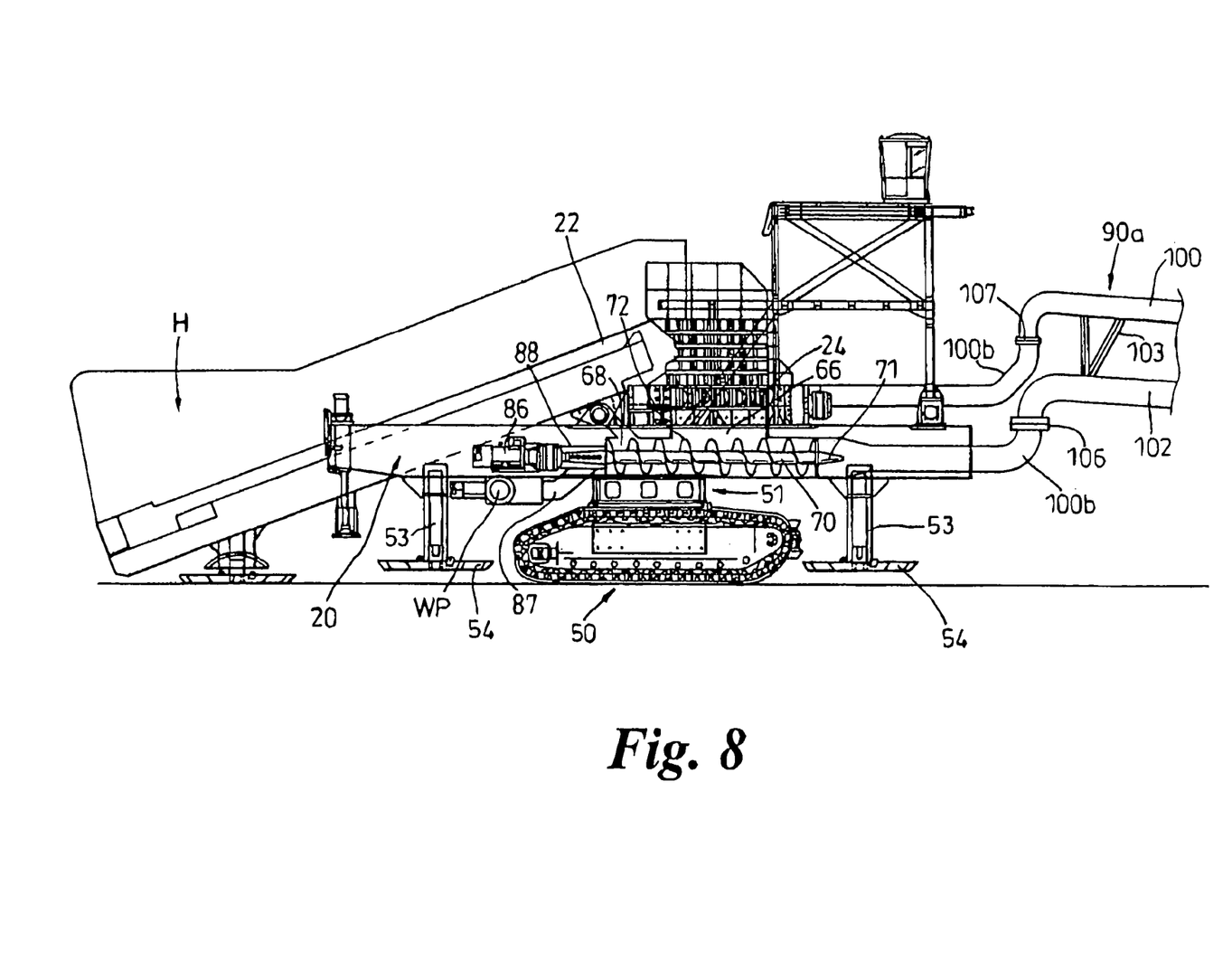
FIG. 8 is a side view of the mobile breaker rig having an alternative mineral inlet valve.
Figure 9:
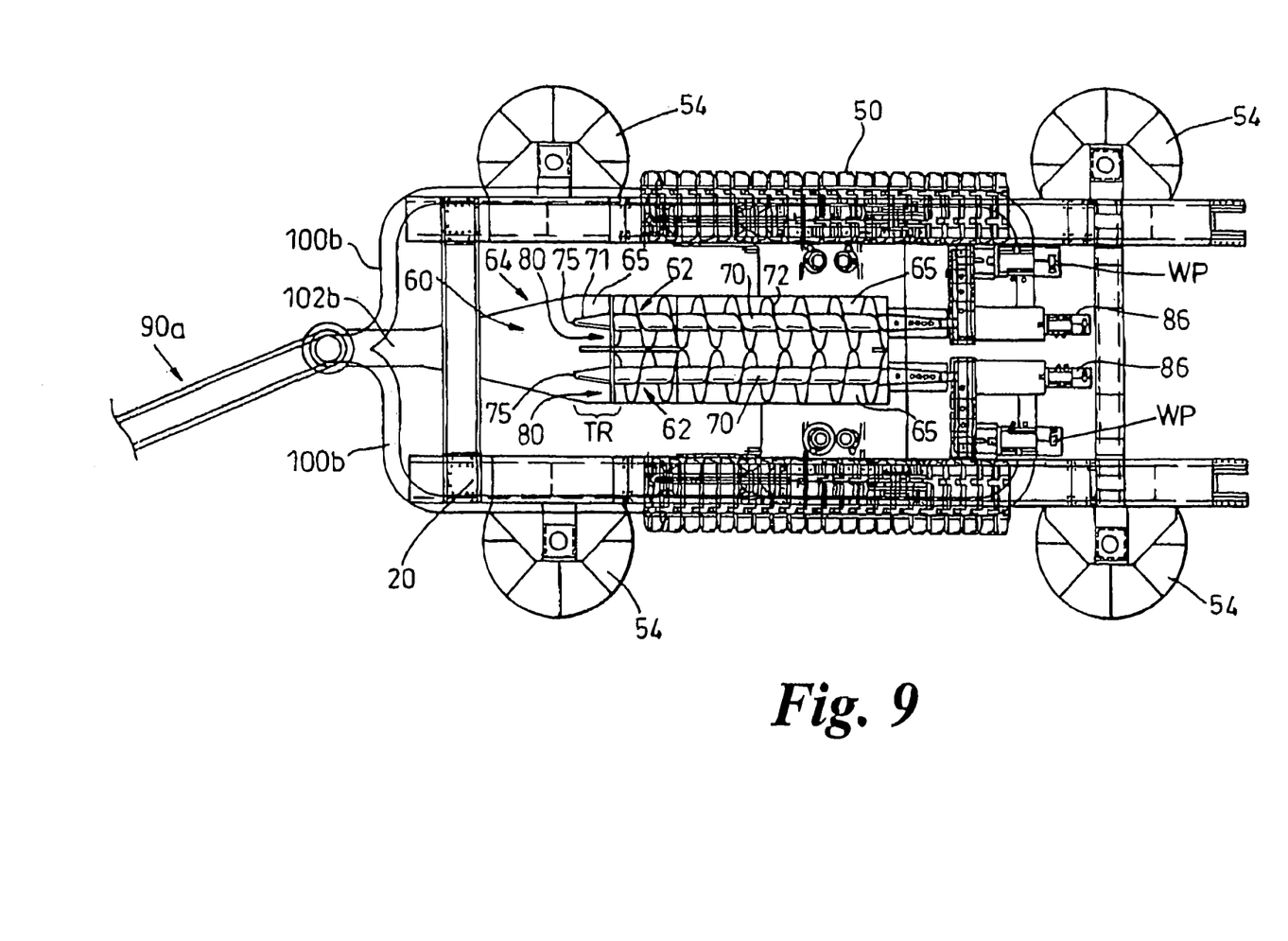
FIG. 9 is a plan view of the mobile breaker rig shown in FIG. 8.
Figure 10:
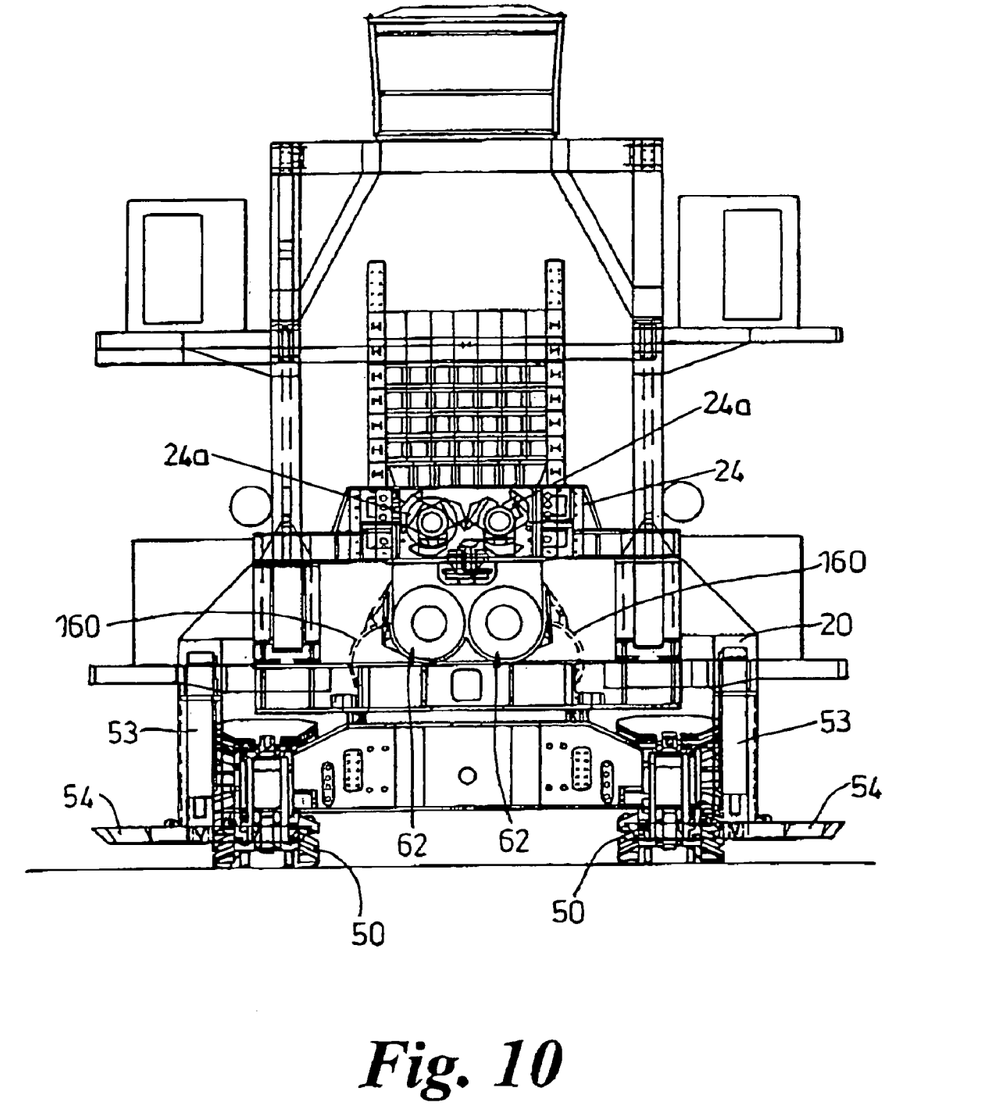
FIG. 10 is an end view of the mobile breaker rig shown in FIG. 8.

In FIGS. 8 to 10 the breaker rig MBR is shown having an auger assembly 60 which constitutes an alternative arrangement to the use of a takeaway conveyor and rotary valve 28 for transferring the tarsand from the mineral breaker 24 and into the extensible pipeline assembly EPA.

The auger assembly includes a pair of side by side augers 62 rotably housed in a casing 64. The casing 64 includes two tubular sections 65 each housing an auger 62. In an upper central region of the casing 64 the two tubular sections have a common opening to define an inlet for mineral emerging from the mineral breaker 24 via an inlet chute 66.

The augers 62 are preferably located on axes of rotation which are parallel to those of the breaker drums 24*a* and are of about the same diameter as the breaker drums. This enables the chute 66 to have vertical walls which is an ideal arrangement since tarsand is less likely to stick to a vertical wall. Access covers 160 are preferably provided to enable access internally of the augers for maintenance purposes.

A pair of secondary mineral inlet chutes 68 are preferably provided on the upstream side of chute 66 which communicate with each tubular section 65 to receive overspill tarsand from the feed conveyor 22.

Each auger 62 is preferably in the form of a hollow shaft 70 about which a helical blade 72 extends. Rotation of an auger 62 causes the tarsand to be transferred into the downstream portion of the tubular section 65. The helical blade 72 terminates in-board of the terminal end 71 of the shaft 70 such that a plug of tarsand is created in the terminal region TR of the tubular section 65. This plug acts as a seal to prevent water flowing along the tubular section 65 in a direction toward the chute 66.

Preferably a comminuting assembly 80 is located within the tubular section 65 immediately upstream of the terminal region TR which act to comminute the tarsand as it passes into the terminal region TR and so acts as a secondary breaking means to further breakdown lumps of tarsand before entry of the tarsand into the extensible pipeline assembly EPA. Preferably the comminuting assembly 80 comprises a fixed disc-like blade having apertures passing therethrough mounted internally on the tubular section 65 and a rotary blade mounted on the shaft 70 which sweeps across an axial face of the fixed disc to shear tarsand as it passes through the apertures in the fixed blade.

Water is pumped along the hollow shaft 70 to emerge through its terminal end 71 through an axially facing port 75. Accordingly, as the plug of tarsand emerges from the terminal region TR it merges with the jet of water emitted from the port 75 to be transported along outlet pipe 102*b*.

It is envisaged that one or more radially directed ports may be formed in the end portion of each shaft 70 so as to enable mixing of water with the tarsand plug before it emerges from each tubular section 65.

As seen in the Figures, the terminal end 71 is preferably tapered inwardly such that port 75 has a reduced diameter relative to the internal diameter of the hollow shaft 70. This creates a venturi effect wherein water flow is accelerated as it emerges from the port 75 and so creates turbulence and also increase flow velocity for causing effective mixing and suspension of the tarsand with the conveying water flow.

The venturi effect also causes slight heating of the water which is advantageous when operating the mobile rig in low atmospheric temperatures.

Each auger is rotated by an individual motor 86 and each shaft 70 is supplied with water from an individual pump WP via a conduit 87 and sealed chamber 88. Water is fed to pumps WP via a pair of pipes 100*a*. Accordingly, if a failure occurs with one of the augers, it is still possible to run the mobile rig at half capacity using the other auger.

Whilst the example shown in FIG. 8 uses a pair of augers 62, it will be appreciated that the pair of augers may be replaced by a single auger. It is also envisaged that each auger may include more than one helical blade and that the helix angle of the or each blade may vary along the length of the hollow shaft 70.

I claim:

1. Apparatus for transporting mineral from a point of mining to a remote location, the apparatus including a mobile mineral breaker rig having a mineral outlet, the rig including a fluid inlet pipe for receiving conveying fluid, a mineral inlet for introducing mineral from said mineral outlet into said fluid pipe and a fluid outlet pipe for conveying said fluid mixed with mineral received from said mineral outlet, an extensible pipeline assembly connected at one end to said inlet and outlet pipes and being adapted for connection at its opposite end to one end of a static pipeline communicating with said remote location, said extensible pipeline assembly being expandable to enable said mobile rig to move away from said one end of the static pipeline whilst maintaining fluid communication therewith, said extensible pipeline assembly comprising a series of elongate pipe assemblies which are articulated at adjacent ends to one another in a zig-zag manner via an articulated joint, each elongate pipe assembly including two lengths of pipe which are arranged side-by-side and secured together such that one length of pipe defines an upper pipe and the other length of pipe defines a lower pipe, the articulated joint between each end of adjacent elongate pipe assemblies including an upper rotary joint which connects adjacent ends of the upper pipes of adjacent pipe assemblies and a lower rotary joint which connects adjacent ends of the lower pipes of adjacent pipe assemblies, the axis of rotation of the upper and lower rotary joints of each articulated joint being co-axial.

2. Apparatus according to claim 1 wherein the extensible pipeline assembly includes first and second end pipe assemblies which are interconnected by at least one intermediate pipe assembly.

3. Apparatus according to claim 1 wherein each articulated joint is supported on the ground by a mobile support.

4. Apparatus according to claim 3 wherein each mobile support is in the form of a castor having a castor wheel mounted on a carriage, the carriage being mounted on a lower pipe via a support frame and being rotatable relative to the support frame about an axis which is co-axial with the axes of rotation of the upper and lower rotary joints of the supported articulated joint.

5. Apparatus according to claim 3 wherein the upper and lower articulated joints permit lateral displacement of the connected upper and lower pipes, one or both pipes of each pipe assembly having a telescopic portion to enable length of the pipe to be varied.

6. Apparatus according to claim 1 wherein the upper and lower pipes of each pipe assembly are rigidly connected to enable the pipes to be self-supporting between articulated joints.

7. Apparatus according to claim 1 wherein the length of pipes of each pipe assembly between each articulation joint is between 50–100 metres.

8. Apparatus according to claim 1 wherein the diameter of the pipes of each pipe assembly is about 1 metre.

9. Apparatus according to claim 1 wherein the extensible pipeline assembly is extensible between a fully contracted condition and a maximum extension, the articulation of the elongate pipe assemblies being restricted such that at said fully contracted condition, adjacent pipe assemblies subtent an angle of about 25° therebetween and at said fully extended condition, adjacent pipe assemblies subtend an angle of about 130° therefrom.

* * * * *